United States Patent [19]
Chiodini et al.

[11] Patent Number: 5,830,381
[45] Date of Patent: Nov. 3, 1998

[54] CURABLE FLUOROELASTOMERIC COMPOSITIONS

[75] Inventors: Graziella Chiodini, Saronno; Vincenzo Arcella, Novara, both of Italy

[73] Assignee: Ausimont S.p.A., Italy

[21] Appl. No.: 833,534

[22] Filed: Apr. 7, 1997

Related U.S. Application Data

[62] Division of Ser. No. 451,160, May 26, 1995, Pat. No. 5,648,430.

[30] Foreign Application Priority Data

May 27, 1994 [IT] Italy .............................. MI94A001080

[51] Int. Cl.$^6$ ...................................................... C09K 3/00
[52] U.S. Cl. ................................ 252/182.14; 252/182.15; 252/182.17; 252/182.24
[58] Field of Search ......................... 252/182.14, 182.15, 252/182.17, 182.24

[56] References Cited

U.S. PATENT DOCUMENTS

| | | |
|---|---|---|
| 3,291,843 | 12/1966 | Fritz et al. . |
| 3,655,727 | 4/1972 | Patel et al. . |
| 3,712,877 | 1/1973 | Patel et al. . |
| 4,789,717 | 12/1988 | Giannetti et al. . |
| 5,260,392 | 11/1993 | Arcella et al. . |
| 5,262,490 | 11/1993 | Kolb et al. . |

FOREIGN PATENT DOCUMENTS

| | | |
|---|---|---|
| 0196904A2 | 10/1986 | European Pat. Off. . |
| 0250767A1 | 1/1988 | European Pat. Off. . |
| 0280312A2 | 8/1988 | European Pat. Off. . |
| 0333062A1 | 9/1989 | European Pat. Off. . |
| 0335705A1 | 11/1989 | European Pat. Off. . |
| 0339126A1 | 11/1989 | European Pat. Off. . |
| 0360292A2 | 3/1990 | European Pat. Off. . |
| 0404411A1 | 12/1990 | European Pat. Off. . |
| 0407937A1 | 1/1991 | European Pat. Off. . |
| 0525685A1 | 2/1993 | European Pat. Off. . |
| 57-200437 | 6/1981 | Japan . |

OTHER PUBLICATIONS

CA Abstract 1983:216977 of JP 57200437 A2.
Sonoi et al., "Fluoroolefin rubber compositions with improved dispersibility, kneadability, modability, stability, and vulcanization properties," Chemical Abstracts, vol. 113, No. 12, Columbus,Ohio, U.S., Abst. No. 99190 (JP–A01 315 449, Nippon Mectron, Ltd., Dec. 20, 1989), Sep. 17, 1990.
Nudel'man et al., "Reason for the accumulation of compression set by SKF–26–bisphenol vulcanizates," Chemical Abstracts, vol. 99, No. 18, Columbus, Ohio, U.S., Abst. No. 141361, Oct. 31, 1983.
Nippon Oil Seal Industry Co., Ltd., Japan, "Molecular compounds for fluoroelastomer vulcanization compounds," Chemical Abstracts, vol. 93, No. 25, Columbus Ohio, U.S., Abst. No. 239650 (JP–A-55 108 884, Nippon Oil Seal Industry Co., Ltd, Aug. 21, 1980), Dec. 22, 1980.
Kirk–Othmer, Encyclopedia of Chemical Technology, vol. 8, pp. 500–515, 1979.

*Primary Examiner*—Bernard Lipman
*Attorney, Agent, or Firm*—Finnegan, Henderson, Farabow, Garrett & Dunner, L.L.P.

[57] ABSTRACT

Curable flurooelastomeric compositions employable for preparing fuel hoses or O-rings for injectors comprising:

A) 100 phr (parts) copolymers or terpolymers based on VDF with a content in fluorine of at least 67% by weight, the VDF being comprised from 30 to 5000 by weight, from 20 to 60% by weight of HFP optionally other monomeric units deriving from a monomer having ethylene unsaturation; the sum of the comonomers being 100;

B) 1 to 5 phr of an adduct between an accelerator and a curing agent in molar ratio from 1:2 to 1:5, the accelerator being an onio-organic compound having a positive charge, the curing agent being a di- or polyhydroxy or di- or polythiol compound; the adduct being obtained by melting of the reaction product between accelerator and curing agent in the indicated molar ratios, or by melting of the adduct mixture 1:1 added with the curing agent in the indicated amounts.

2 Claims, No Drawings

CURABLE FLUOROELASTOMERIC COMPOSITIONS

This application is a division of application Ser. No. 08/451,160, filed May 26, 1995, now U.S. Pat. No. 5,648,430.

The present invention relates to curable vinylidene-fluoride copolymers having a high content in fluorine, the other comonomers deriving from fluorinated monomers with ethylene unsaturation.

More in detail the present invention relates in particular to fluoroelastomeric copolymers based on vinylidene-fluoride (VDF), hexafluoropropene (HFP), optionally in the presence of one or more comonomers ethylenically unsaturated, the F amount being higher than 67% by weight.

More particularly the invention relates to fluoroelastomeric copolymers based on VDF suitable to the preparation of fuel hoses and shaft seals.

It is known that for the preparation of these articles, fluoroelastomeric polymers are required having good resistance to motor oils and/or to petrols containing polar substances, in particular alcohols.

This property must be combined with good elastomeric properties such as compression set and good mechanical properties and good processability in molding both by compression, by injection and by extrusion.

The same copolymers can be also used for preparing O-rings used in the injectors coming into contact with petrols and/or oils containing polar substances.

It is known making articles based on VDF, HFP and tetrafluoroethylene (TFE), optionally in the presence of perfluoroalkylvinylethers (PAVE), using the peroxidic curing. The disadvantage is that the compression set obtained are poor and the removal from molds is unsatisfactory.

It is also known from the previous patent application of the Applicant, EP 525687, which corresponds to U.S. Pat. No. 5,260,392 to carry out the ionic curing with known accelerators and curing agents. The drawback is that these products show mechanical properties lower than the products cured with peroxides.

To obviate these inconveniences in the art it is known to use also processing aids such as sulphones or sulphoxides. The drawback is that the addition of these products, even though they lead to an improved rubber processing, worsen the mechanical properties and depending on the accelerating system worsen also the compression set.

It is known, moreover, that the elastomeric polymers having high content of fluorine show a bad processability due to the high viscosity of the compound.

All the disadvantages of the copolymes based on VDF with low content in fluorine (less than 67% by weight), are even more stressed in case of VDF copolymers having high content in fluorine, as indicated above.

In case of copolymers or terpolymers, indeed, having high content in fluorine, the crosslinking is even more difficult and wherefore the mechanical and elastic properties and the processability of the article result poor.

It has surprisingly and unexpectedly been found that it is possible to prepare fluoroelastomeric polymers based on VDF having a very good combination of
high mechanical properties,
low compression set,
low viscosity of the compound such as to allow an easy processing both by compression, by injection and by extrusion,
high resistance to oils and to petrols containing polar substances, such as alcohols or ethers.

This has been made possible by using ionic curing with a particular accelerating/curing system as herein defined.

Object of the present invention are curable fluoroelastomeric compositions comprising A) 100 phr (parts) copolymers of terpolymers based on VDF having a content in fluorine of at least 67% by weight, the VDF being comprised from 30 to 50% by weight, from 20 to 60% by weight of HFP, optionally other monomeric units deriving from a monomer having ethylene unsaturation; the sum of the comonomers being 100. In case of copolymers, the VDF ranges from 40 to 50 and HFP ranges from 50 to 60% by weight. The other comonomers are preferably from 0 to 30% of TFE and from 0 to 40% of perfuoroalkylvinylethers, preferably 0–20%;

B) 1 to 5 phr, preferably 2 to 4.5, of an adduct between an accelerator and a curing agent in molar ratio from 1:2 to 1:5, preferably 1:2 to 1:3, the accelerator being an onio-organic compound having a positive charge, the curing agent being a di- or polyhydroxy or di- or polythiol compound; the adduct being obtained by melting of the reaction product between accelerator and curing agent in the indicated molar ratios, or by melting of the adduct 1:1 added with the curing agent in the amounts to reach the 1:2 to 1:5 adduct;

optionally

C) the accelerator indicated in B) in amounts from 0.05 to 0.5 phr.

The onium compound used as accelerator in B) and C) and forming the adduct cation is generally selected from the following classes:

I) aminophosphonium $[P(NR'R'')_n(R^1\ R^2\ R^3)_{4-n}]^+$ wherein n is an integer from 1 to 3; R', R" and $R^1\ R^2\ R^3$, equal or different from each other, are alkylic, cycloalkylic, arylic, arylalkylic, oxyalkylic or polyoxyalkylic groups having a free or esterified terminal —OH function; R' and R" contain from 1 to 7 carbon atoms and can be linked each other so as to form an heterocyclic ring with the nitrogen atom while $R^1$, $R^2$, $R^3$ equal or different from each other contain from 1 to 18 carbon atoms;

II) compounds having the formula

$$Q^+(R^a R^b R^c R^d)_4$$

wherein Q is selected from nitrogen, phosphorus, arsenic, antimonium;

(III) compounds having formula:

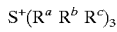

$$S^+(R^a\ R^b\ R^c)_3$$

wherein in II) and III) $R^a$, $R^b$, $R^c$, $R^d$ are selected from alkyls, aryls, alkylaryls or their combinations, two of said free radicals can be linked each other and the Q or S atom can form an heterocyclic ring. Preferred compounds are quaternary phosphonium compounds containing at least a phosphorus atom linked by four covalent simple bonds to four organic radicals, the organic radicals generally containing from 1 to 30 carbon atoms, preferably from 2 to 8. The organic radical, being linear or branched, can contain heteroatoms. Preferred compounds are triphenylbenzylphosphonium, tetrabutylphosphonium. The accelerator can be also a blend of the compounds of the single classes I) to III), or of more compounds of the same class.

The anion forming the adduct must be a curing agent and is generally selected from the polyhydroxy or polythiol compounds comprising the following classes:

X1) $A(BH)_m$ wherein A is an arylene radical optionally substituted with alkylic groups, such radical including optionally alkyl groups has from 6 to 14 carbon atoms, B is oxygen or sulphur and m is equal to 2 or 3;

X2) HB—R$^{4a}$—BH wherein R$^4$a is an alkylene or cycloalkylene radical optionally substituted with alkylic groups, such radical including optionally alkyl groups has from 6 to 18 carbon atoms and B is oxygen or sulphur;

wherein R$^{2a}$ is —SO—, —SO$_2$—, —CO— or a linear or branched alkylene radical containing from 1 to 9 carbon atoms and wherein the H atoms can be partially or wholly substituted with F atoms;

X4) HOCH$_2$—R$^{3a}$—CH$_2$OH wherein R$^{3a}$ is a perfluoropolyether or polyfluoroether chain, the average molecular weight by number Mn being from 360 to 2,000.

The accelerators forming the cation are described in the art for instance in U.S. Pat. No. 4,259,463 for aminophosphonium compounds, in U.S. Pat. No. 3,712,877 for quaternary phosphonium salts, U.S. Pat. No. 3,655,727 for quaternary ammonium salts, in EP 337705 for class III).

The preferred cations are those deriving from aminophosphonium wherein the phosphorus atom is linked to a nitrogen atom and the other three covalent bonds are formed by organic radicals wherein the carbon is linked to phosphorus.

The following compounds can be cited:

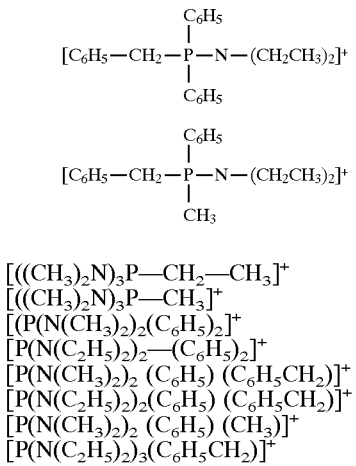

[((CH$_3$)$_2$N)$_3$P—CH$_2$—CH$_3$]$^+$
[((CH$_3$)$_2$N)$_3$P—CH$_3$]$^+$
[(P(N(CH$_3$)$_2$)$_2$(C$_6$H$_5$)$_2$]$^+$
[P(N(C$_2$H$_5$)$_2$)$_2$—(C$_6$H$_5$)$_2$]$^+$
[P(N(CH$_3$)$_2$)$_2$ (C$_6$H$_5$) (C$_6$H$_5$CH$_2$)]$^+$
[P(N(C$_2$H$_5$)$_2$)$_2$(C$_6$H$_5$) (C$_6$H$_5$CH$_2$)]$^+$
[P(N(CH$_3$)$_2$)$_2$ (C$_6$H$_5$) (CH$_3$)]$^+$
[P(N(C$_2$H$_5$)$_2$)$_3$(C$_6$H$_5$CH$_2$)]$^+$

The compound 1,1-diphenyl-1-benzyl-N-diethytl-phosphoramine is particularly preferred.

Among the quaternary phosphonium compounds it can be cited (CH$_3$)$_2$(C$_2$H$_5$)$_2$P$^+$
(C$_2$H$_5$)$_3$(C$_{18}$H$_{37}$)P$^+$
(CycloC$_6$H$_{11}$)$_2$(C$_6$H$_{13}$)$_2$P$^+$
(C$_4$H$_9$)$_3$CH$_2$=CH—CH$_2$P$^+$
(C$_4$H$_9$)$_4$P$^+$
(C$_6$H$_5$)$_3$(C$_6$H$_5$CH$_2$)P$^+$
(C$_6$H$_5$)$_3$ (CH$_3$OC$_3$H$_5$)P$^+$
(C$_8$H$_{17}$)$_3$[(CH$_3$)$_2$NCH$_2$CH$_2$CH$_2$]P$^+$
(C$_8$H$_{17}$)$_3$(HOC$_3$H$_4$)P$^+$
$^+$P(C$_2$H$_5$)$_3$CH$_2$CH$_2$CH$_2$CH$_2$(C$_3$H$_5$)$_3$P$^+$ Tetrabutyl phosphonium is particularly preferred.

Among anions the bisphenol compounds (class X3), wherein the R$^{2a}$ radical is the perfluoroalkyl group from 3 to 7 carbon atoms, and the OH are in para position, are preferred. The most preferred compound is R$^{2a}$=—C(CF$_3$)$_2$—.

The adduct can be prepared as follows.

The polyhydroxy or polythiol compound is reacted, in aqueous solution or in a suitable solvent, for instance methanol, wherein the accelerator is soluble, in a first step, with a basic substance, for instance NaOH, KOH, Ca(OH)$_2$ and tBuO$^-$K$^+$, generally by using one equivalent gram of basic substance for mole of accelerator. The reaction product is then reacted in a second step with an accelerator salt, for instance a chloride. The desired salt precipitates. After filtering and drying, the product is melted which through cooling, solidifies in flakes or pellets giving the adduct utilized in the present invention. This solid form is particularly suitable for its handling and its compounding in the blends.

The polyhydroxy or polythiol compounds are used in molar ratios from 2:1 to 5:1 with respect to the accelerator.

Without being bound to any theory, it seems by IR spectra that the excess of polyhydroxy compound results linked to the cation also when this results in excess with respect to the stoichiometric, as it must be according to the present invention.

Tests carried out by the Applicant have shown that the adducts with excess of bisphenol with respect to the accelerator show superior properties if the amount of curing agent is added in excess during the adduct preparation or after the adduct achievement in molar ratios 1:1 between accelerator and curing agent, before bringing to melting the reaction mixture containing the excess of curing agent.

As a matter of fact, if the adduct in molar ratio 1:1 is prepared and the reaction product is melted and only afterwards the desired amount of curing agent is added, the improved results according to the present invention are not obtained.

The curing blend comprises moreover, in order to obtain the cured products through heating, a) one or more acceptors of inorganic acids selected among the ones known in ionic vulcanisation of vinylidene fluoride copolymers, in amounts 1–40 parts for 100 parts fluoroelastomeric copolymer;

b) one or more basic compounds selected from those known in ionic vulcanisation of vinylidene fluoride copolymers, in amounts from 0.5 to 10 parts for 100 parts of fluoroelastomeric copolymer.

As also known, the basic compounds of point b) are usually selected from the group consisting of Ca(OH)$_2$, Sr(OH)$_2$, Ba(OH)$_2$, metal salts of weak acids, such as for instance carbonates, benzoates, oxalates and phosphites of Ca, Sr, Ba, Na and K and mixtures of the aforesaid hydroxides with the abovesaid metal salts.

The composition according to the present invention commonly comprises other known components, such as fillers, for instance, carbon black, silica and dyes, generally from 5 to 30 phr; and processing adjuvants, for instance plasticizers, generally from 0.1 to 5 phr.

However an advantage according to the present invention consists in that optimum results are obtained without using processing adjuvants, such as sulphones, which generally lead to a worsening of the final properties depending on the used accelerating system.

The fluoroelastomeric copolymers, as said above, are vinylidenefluoride copolymers with one or more fluorinated monomers having ethylene unsaturation. In particular the copolymers of the present invention are VDF copolymers with hexafluoropropene.

Other comonomers having ethylene unsaturation which can be used are vinylethers (PAVE) in amounts from 0 to 40% by weight, preferably 0–20%. The preferred vinylethers are perfluoroalkylperfluorovinylethers, in particular perfluoromethylperfluorovinylether (MVE) and perfluoropropylperfluorovinylether. Utilizable perfluorovinylethers and perfluoroalkoxyvinylethers are described in U.S. Pat. No. 3,291,843.

Other comonomers which can be utilized in amounts from 0 to 30% are for instance tetrafluoroethylene and/or chlorotrifluoroethylene.

The olefinic monomers having up to 4° C. are for instance selected from ethylene and propene, the preferred being ethylene (Et), and are used in amounts from 0 to 25% by weight, preferably from 0 to 10%.

The preferred copolymers forming the object of the preent invention are characterized by the following preferable composition by weight of monomeric units:

|  | % by weight |
| --- | --- |
| VDF | 40–50% |
| HFP | 50–60%; |
| or by the composition: | |
| VDF | 30–50% |
| HFP | 20–60% |
| TFE | 10–30%; |
| or by the composition: | |
| VDF | 30–47% |
| HFP (hexafluoropropene) | 20–40% |
| PAVE | 3–20% |
| TFE | 10–30% |

The copolymers of the invention-combine a good chemical resistance with a high curing rate, essential requirement in transformation techniques such as injection molding.

Such copolymers are capable of meeting more and more severe marketing specifications, which require good resistance to alcohols and to petrols containing alcohols especially methanol.

The VDF copolymers containing olefins particularly suitable due to their high resistance to alcohols and to bases, in particular oils containing amines, contain preferably the following monomer units:

|  | % by weight |
| --- | --- |
| VDF | 30–50% |
| HFP | 20–58% |
| PAVE | 0–40% |
| ethylene | 2–15% |
| TFE | 0–30% |

The fluoroelastomeric copolymers according to the present invention are prepared by emulsion polymerization according to well known techniques, preferably in the presence of radicalic initiators such as for instance persulphates, perphosphates, alkaline or ammonium perborates or percarbonates, optionally in combination with reducing agents such as sulphites, bisulphites, hyposulphites, phosphites, hypophosphites of alkaline or ammonium metals, or in combination with ferrous, cupreous or silver salts, or of other easily oxidable metals. Such methods are described in Kirk Othmer, Encyclopaedia of Chemical Technology, vol. 8, pag. 500 and on, 1979. As polymerization methods can be used, in particular, the mass polymerization, that in solution of organic solvents and the one in emulsion or suspension in water.

Surfactants, such as for instance ammonium perfluorooctanoate or others known to be suitable in preparing fluoroelastomers can be present in the polymerization medium, for example ammonium perfluoro-octanoate.

Chain transfer agents can generally be used as molecular weight regulators. Among them ethyl acetate, ethyl malonate, iodided and/or brominated chain transfer agents, such as for instance the compounds having the general formula $Rf(I)_x(Br)_y$ wherein Rf=perfluorinated hydrocarbon radical containing from 1 to 8 carbon atoms, x, y being integers comprised between 0 and 2, with at least x or y=1 and x+y is at most 2. It can also be used compounds having also some I or Br in the place of F of the perfluorinated hydrocarbon. These are known as polyiodided or polybrominated compounds Moreover iodides and/or bromides of alkaline or alkaline-earth metals as described in European patent application No. 407937 can be used.

When the polymerization is over, the fluoroelastomer is isolated from the polymeric latex by known methods, such as coagulation by addition of electrolytes or by cooling.

The polymerization reaction is generally carried out at temperatures from 25° C. to 150° C., under pressure up to 10 MPa.

The preparation of the elastomeric copolymers according to the invention can be carried out also by polymerization in the presence of a microemulsion formed by one or more perfluoropolyoxyalkylenes and water, according to the method described in European patent application No. 250767.

The polymerization can be carried out also by using, instead of a microemulsion, an emulsion or a dispersion of perfluoropolyoxyalkylenes and water according to the method described in U.S. Pat. No. 4,789,717.

Also the emulsions and dispersions of perfluorooxyalkylenes and water described for instance in European patent applications Nos. 196904, 280312 and 360292, can be used for this purpose.

For the curing of the polymers of the invention the elastomeric composition must be heated under pressure, at a temperature from 130° C. to 230° C., preferably from 160° C. to 200° C., for a period of time comprised from 0.5 to 60 minutes and, preferably, from 1 to 15 minutes. The obtained articles can then be post-cured in stove or in oven, at atmospheric pressure, at a temperature from 130° to 300° C, preferably from 200° C. to 275° C., for a period of time from 5 to 48 hours, and, preferably, from 10 to 24 hours.

The following examples are given for illustrative purpose but do not limit the scope of the present invention.

EXAMPLES

Preparation of the Adduct 2 adducts according to the present invention are prepared by starting from the accelerator indicated below and from the bisphenol AF (BAF):

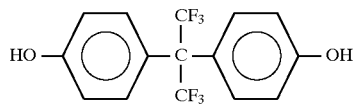

The accelerator has the following formula:

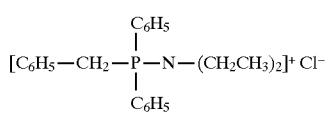

The preparation of the adduct produced starting from one accelerator mole and 5 (or 2 moles in case of 1:2 ratio, 3 moles for 1:3, and 4 moles for 1:4), moles of bisphenol AF gives the adduct in the molar ratio specified above.

In a 10 l glass reactor, equipped with a dropping funnel and a stirrer, 352.8 g (1.05 moles) of bisphenol AF are dispersed under stirring into 5 l of water. A solution of 8.4 g (0.21 moles) of NaOH in 500 cc of water is then quickly dropped in the reactor. The reactor is kept under stirring at room temperature for 30 minutes. Then a solution of 80.5 g (0.21 moles) of amino-phosphonium dissolved in 800 cc of water is dropped under stirring in the reactor. A very thick suspension is obtained; it is kept under stirring at room temperature for 2 hours; then it is let to stay for about 4 hours. It is filtered on cloth and washed twice with overall 2 l of water. It is dried in a vacuum stove to 50°–60° C. for 20 hours and then the reaction mixture is brought to melt by heating at 100°–120° C. and it is allowed to cool, thus obtaining the adduct 1:5 according to the present invention.

EXAMPLES 1–3

In Table 1 the formulation of 3 compounds is reported, the first of which (compound No. 1) is a composition wherein an adduct according to the present invention was not used, but, separately, the accelerator and the bisphenol AF. In the compounds 2 and 3 the adduct prepared according to the present invention was utilized. The fluoroelastomer is TEC-NOFLON® TH 340 of Ausimont, vinylidene fluoride, hexafluoropropene and tetrafluoroethylene terpolymer having a Mooney viscosity ML (1+10) at 121° C. equal to 58, whose composition is:

| | |
|---|---|
| VDF | 37% by weight |
| HFP | 37% by weight |
| TFE | 26% by weight |

(Fluorine: 70% by weight)

TABLE 1

FORMULATION OF THE COMPOUND

| | Ex. 1 (cfr) (phr) | Ex. 2 (phr) | Ex. 3 (phr) |
|---|---|---|---|
| Fluoroelastomer TH 340 | 100 | 100 | 100 |
| Bisphenol AF | 2.7 | — | — |
| Accelerator (I) | 1.35 | — | — |
| Adduct (II) | — | 4.5 | — |
| Adduct (III) | — | — | 3.5 |
| MgO | 3 | 3 | 3 |
| Ca(OH)$_2$ | 6 | 6 | 6 |
| MT Black | 30 | 30 | 30 |

Accelerators (I): [Ph$_2$P—N—(CH$_2$CH$_3$)$_2$]$^+$Cl$^-$
　　　　　　　　　|
　　　　　　　　CH$_2$Ph
CH$_2$Ph Adduct (II): molar ratio accelerator/bisphenol 1:3 obtained by melting the reaction mixture.
Adduct (III): 1:5 obtained by melting of the reaction mixture.

Characterization of the Compound of Table 1A

These blends were cured at 170° C. in press and then to a post-curing in air stove between 200° C. and 250° C. for 24 hours.

The curing evaluation was carried out by oscillating disc rheometer (ODR) of Monsanto type according to ASTM D 2084/81.

The data relating to the blends viscosity, the curing characteristics and the mechanical properties are reported in Table 1A.

TABLE 1A characteristics of the compound of Table 1.

| | Ex 1 (cfr) | Ex. 2 | Ex. 3 |
|---|---|---|---|
| Rheometric properties Mooney Viscosity (ASTM D1646-82) | | | |
| ML(1 + 10) at 121° C. (Mooney) | 106 | 82 | 103 |
| Mooney Scorch at 135° C. | | | |
| Minimum Viscosity (in Mooney) | 44 | 32 | 45 |
| Time for increasing of 15 points the viscosity (min) | 11'45" | 33'20" | 30' |
| ODR 12' at 177° C., Arc +/– 3° (ASTM D2084-81) | | | |
| ML (lbf · in) | 16 | 13 | 16 |
| MH (lbf · in) | 72 | 108 | 96 |
| ts2 (sec) | 123 | 141 | 168 |
| t90 (sec) | 249 | 270 | 333 |
| V$_{max}$ (lbf · in/sec) | 0.8 | 1.8 | 1.2 |
| Mechanical properties (ASTM D412-83) Post cure @ 250° C. × 8 + 16 hours | | | |
| Modulus 100% (MPa) | 6.6 | 7.9 | 6.9 |
| Tensile stress (MPa) | 13.5 | 16 | 15.5 |
| Elongation at break (%) | 228 | 181 | 219 |
| Hardness Shore A | 82 | 82 | 85 |
| Compression Set 70 h at 200° C. | | | |
| (ASTM D 395 Method B) O-rings 214 (%) | 66 | 31 | 32 |

From the above results it is noticed that the viscosity decreases by indicating an improved processability; the scorch increases therefore indicating a greater compound safety; the curing (ODR) shows a greater crosslinking yield (MH) and higher curing rate (v$_{max}$). The balance of the mechanical properties is surprisingly very satisfactory: a higher tensile stress/elongation ratio is obtained. The compression set is unexpectedly improved to a great extent.

EXAMPLES 4–5

Examples 1–3 were repeated using a fluoroelastomer TECNOFLON® T428E of Ausimont: terpolymer of vinylidenefluoride, hexafluoropropene and tetrafluoroethylene, having a Mooney ML (1+10) viscosity at 121° C. equal to 20, whose composition is:

| | |
|---|---|
| VDF | 45% by weight |
| HFP | 33% by weight |
| TFE | 22% by weight |

(Fluorine: 68.5% by weight); $[\eta]_{MSK}^{30°\ C.}$=55 (intrinsic viscosity).

The formulations are reported in Table 2 and the characteristics are reported in Table 2A.

TABLE 2

COMPOUNDS FORMULATION

| | Ex. 4 (cfr) (phr) | Ex. 5 (phr) |
|---|---|---|
| Fluoroelastomer NMA2 | 100 | 100 |
| Bisphenol AF | 1.5 | — |
| Accelerant (I) | 0.6 | — |
| Adduct (II) | — | 2 |

TABLE 2-continued

COMPOUNDS FORMULATION

|  | Ex. 4 (cfr) (phr) | Ex. 5 (phr) |
|---|---|---|
| MgO | 3 | 3 |
| Ca(OH)$_2$ | 6 | 6 |
| MT Black | 30 | 30 |

TABLE 2A characteristics of the compound of Table 1.

|  | Ex. 4 (cfr) | Ex. 5 |
|---|---|---|
| Rheometric properties |  |  |
| Mooney Viscosity (ASTM D 1646-82) |  |  |
| ML(1 + 10) at 121° C. (in Mooney) | 39 | 39 |
| Mooney Scorch at 135° C. |  |  |
| Minimum Viscosity (in Mooney) | 14 | 13 |
| Time for increasing of 15 points the viscosity (min) | 37'30" | 40'30" |
| ODR 12' at 177° C. Arc +/31 3° (ASTN D2084-81) |  |  |
| ML (lbf · in) | 4 | 4 |
| MH (lbf · in) | 44 | 52 |
| ts2 (sec) | 195 | 168 |
| t90 (sec) | 285 | 237 |
| V$_{max}$ (lbf · in/sec) | 0.8 | 1.4 |
| Mechanical properties (ASDTN D412-83) |  |  |
| Post curing @ 250° C. x 8 + 16 hours |  |  |
| Modulus 100% (MPa) | 2.5 | 4.0 |
| Tensile strength (MPa) | 12 | 14 |
| Elongation at break (%) | 329 | 286 |
| Hardness Shore A | 63 | 62 |
| Compression Set 70 h at 200° C. (ASTM D 395 Method B) O-rings 214 (%) | 54 | 34 |
| Compressions 70 h at 23° C. O-rings 214 (%) | 44 | 30 |

The results show the same previous trends, in particular as regards the curing rate (v$_{max}$), compression set and the improved balance of the mechanical properties.

EXAMPLES 6–7

Examples 1–3 were repeated with the fluoroelastomer indicated below; the formulations are reported in Table 3 and the characteristics in Table 3A. High fluorine tetrapolymer TECNOFLON® LX 5291 having composition:

| VDF | 32% by weight |
| HFP | 30% by weight |
| MVE | 7% by weight (perfluoromethylvinylether) |
| TFE | 31% by weight |

(Fluorine 70% by weight), ML(1 + 10) at 121° C. = 31.

TABLE 3 COMPOUND FORMULATION

|  | Ex. 6 (cfr) (phr) | Ex. 7 (phr) |
|---|---|---|
| Fluoroelastomer | 100 | 100 |
| Bisphenol AF | 2.7 | — |
| Accelerant (I) | 1.35 | 0.3 |
| Adduct III | — | 3.5 |
| MgO | 3 | 3 |
| Ca(OH)$_2$ | 6 | 6 |
| MT Black | 30 | 30 |

TABLE 3A characteristics of the compound of Table 3.

|  | Ex. 6 (cfr) | Ex. 7 |
|---|---|---|
| Rheoetric properties |  |  |
| Mooney Viscosity (ASTM D 1646-82) |  |  |
| ML(1 + 10) at 121° C. (in Mooney) | 78 | 74 |
| ODR 12' at 177° C. Arc +/31 (ASTM D2084-81) |  |  |
| ML (lbf · in) | 10 | 9 |
| MH (lbf · in) | 54 | 77 |
| ts2 (sec) | 225 | 246 |
| t90 (sec) | 350 | 390 |
| V$_{max}$ (lbf · in/sec) | 0.5 | 1.1 |
| Mechanical properties (ASDTM D412-83) |  |  |
| Post curing @ 250° C. x 8 + 16 hours |  |  |
| Modulus 100% (MPa) | 5.3 | 6.0 |
| Tensile strength (MPa) | 11 | 13 |
| Elongation at break (%) | 220 | 203 |
| Hardness Shore A | 79 | 81 |
| Compression Set 70 h at 200° C. (ASTM D 395 Method B) |  |  |
| O-ring 214 (%) | 63 | 30 |

By comparing the results it is noted the same trend of the previous examples: an improved processability (lower Mooney of the compound); improved crosslinking yield (MH) and crosslinking rate (v$_{max}$); the balance of the mechanical and elastomeric properties shows a clear improvement.

We claim:

1. Adduct between an accelerator and a curing agent in molar ratio from 1:2 to 1:5, the accelerator being an onioorganic compound having a positive charge, the curing agent being a di- or polyhydroxy or di- or polythiol compound; the adduct being obtained by melting of the reaction product between accelerator and curing agent in the indicated molar ratios, or by melting of the adduct mixture 1:1 added with the curing agent in the indicated amounts.

2. Adduct according to claim 1 wherein the cation is selected from the classes consisting of I) aminophosphonium $(P(NR'R''))_n(R^1R^2R^{3})_{4-n})$ wherein n is an integer from 1 to 3;

R', R" and $R^1$ $R^2$ $R^3$, equal or different from each other, are alkyl, cycloalkyl, aryl, arylalkyl, oxyalkyl or polyoxyalkyl groups having a free or esterified terminal —OH function;

R' and R" contain from 1 to 7 carbon atoms and can be linked to each other so as to form an heterocyclic ring with the nitrogen atom while $R^1$, $R^2$, $R^3$ are equal or different from each other and contain from 1 to 18 carbon atoms;

II) compounds having the formula $$Q^+(R^a R^b R^c R^d)_4$$

wherein Q is selected from nitrogen, phosphorus, arsenic, antimonium;

III) compounds having formula;

$$S^+(R^a\ R^b\ R^c)_3$$

wherein, in II) and III), $R^a$, $R^b$, $R^c$, $R^d$ are selected from alkyls, aryls, alkylaryls or their combinations, two of said free radicals can be linked to each other, and the Q or S atom can form an heterocyclic ring; and the anion is selected from the compounds consisting of X1) $A(BH)_m$ wherein A is an arylene radical optionally substituted with alkyl groups, such radical including optionally alkyl groups having from 6 to 14 carbon atoms, B is oxygen or sulphur and m is equal to 2 or 3;

X2) $HB—R^{+a}—BH$ wherein $R^{+a}$ is an alkylene or cycloalkylene radical optionally substituted with alkylic groups, such radical including optionally alkyl groups having from 6 to 18 carbon atoms, and B is oxygen or sulphur;

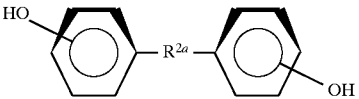

wherein $R^{2a}$ is —SO—, —SO$_2$—, —CO— or a linear or branched alkylene radical containing from 1 to 9 carbon atoms and wherein the H atoms can be partially or wholly substituted with F atoms;

X4) $HOCH_2—R^{3a}—CH_2OH$ wherein $R^{3a}$ is a perfluoropolyether or polyfluoroether chain, the average molecular weight by number, Mn, being from 360 to 2,000.

* * * * *

UNITED STATES PATENT AND TRADEMARK OFFICE
CERTIFICATE OF CORRECTION

PATENT NO. : 5,830,381
DATED      : November 3, 1998
INVENTOR(S): Graziella Chiodini et al.

It is certified that error appears in the above-indentified patent and that said Letters Patent is hereby corrected as shown below:

Title page, item [57], line 5 of Abstract, "5000" should read --50%--.

Signed and Sealed this

Twenty-third Day of February, 1999

Q. TODD DICKINSON

*Attest:*

*Attesting Officer*     Acting Commissioner of Patents and Trademarks